United States Patent Office 2,922,270
Patented Jan. 26, 1960

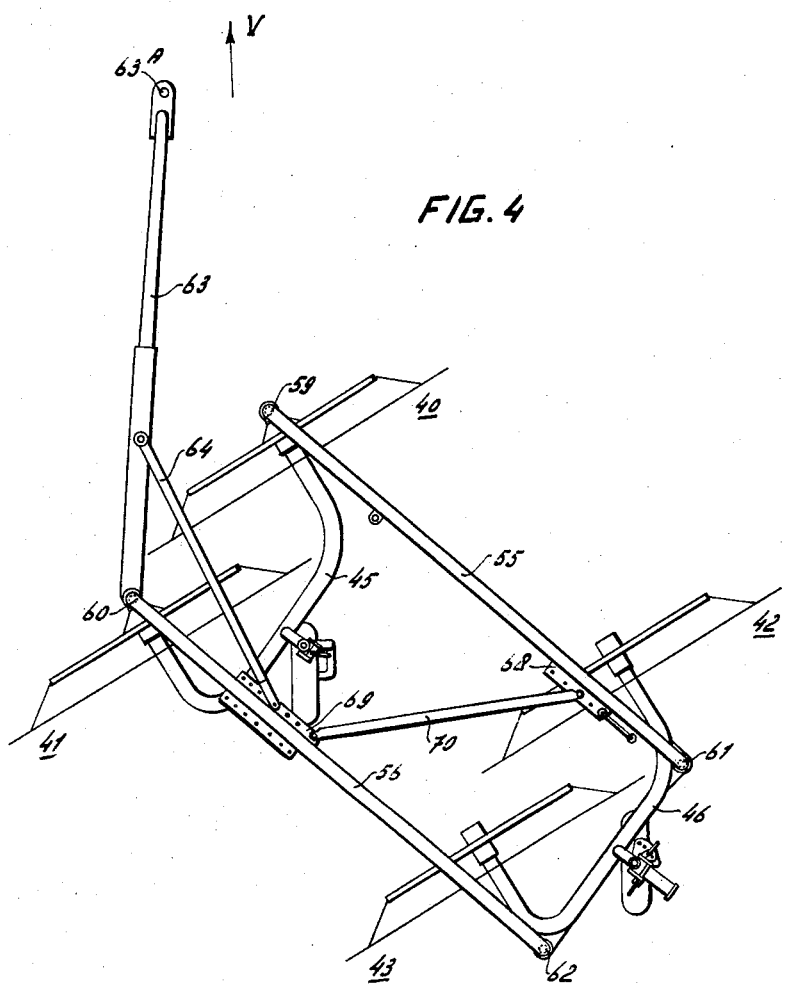

2,922,270

CONVERTIBLE SIDE DELIVERY RAKE

Cornelis van der Lely and Ary van der Lely, Maasland, Netherlands, assignors to C. van der Lely N.V., Maasland, Netherlands, a Dutch limited company Application May 9, 1956, Serial No. 583,682

Claims priority, application Netherlands May 11, 1955

30 Claims. (Cl. 56—377)

The invention relates to a device for laterally raking material lying on the ground, comprising a frame which is provided with a number of rotatable rake wheels or similar raking members obliquely arranged with regard to the travelling direction and overlapping in at least one row or echelon, having at their circumference tines or other raking means. Rotation of such raking members is caused by contact with the ground during forward motion of the mobile frame. Raked material is delivered laterally. Means is provided, however, whereby one row of overlapping raking members can be modified by adjustment of the frame into two rows of raking members each capable of turning separate swaths.

A similar device has been described in the Dutch patent specification No. 70,201.

It is an object of this invention to provide such a device in which means to modify the relative position of the rake wheels is simplified and can be accomplished with ease by unskilled labor without concern that parts of the device would be unduly strained. Moreover, the invention provides more rigid construction which will prolong its life and promote safe operation.

According to the invention, means are provided whereby each echelon of the raking means is maintained parallel to the other echelon irrespective of the distance between them.

The present invention will be explained with reference to the drawing by means of two examples of embodiments.

In the drawing:

Fig. 4 represents a plan view showing the device in Fig. 3 in a different position.

Figure 1:
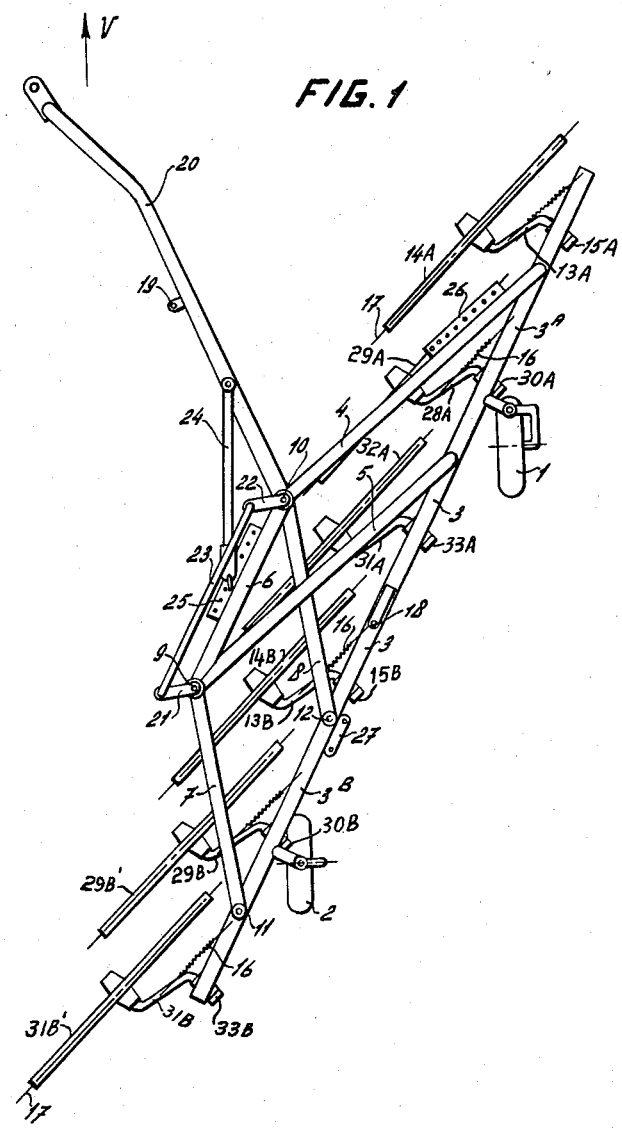
Fig. 1 shows a plan view of a first example of embodiment of the invention.
Figure 2:
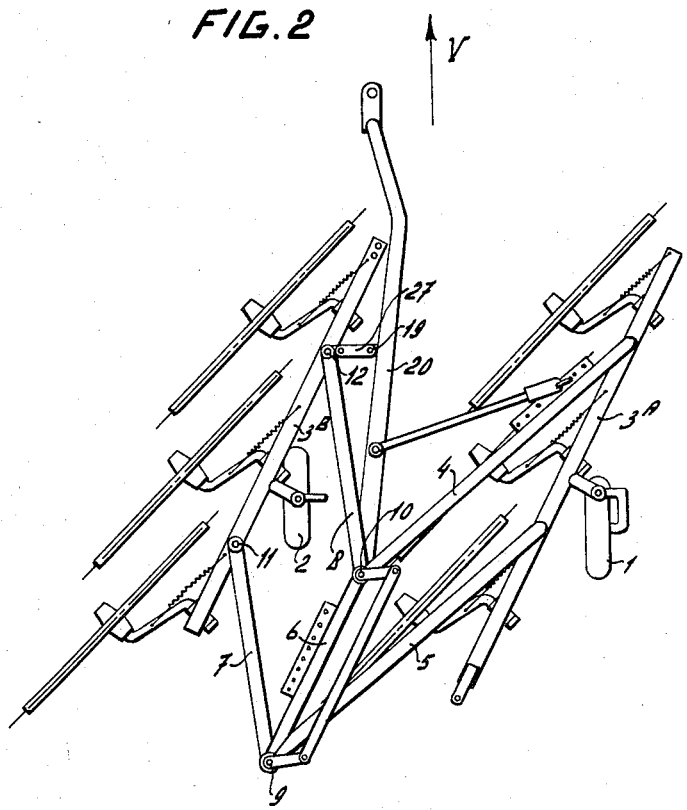
Fig. 2 represents a plan view showing the device in Fig. 1 in a different position.

In the device shown in Figs. 1 and 2 there is a mobile frame which is supported by running wheels 1 and 2. The frame comprises a divisible supporting beam 3, two cross beams 4 and 5, a rake supporting element 6, two rigid links comprising parallel pivot beams 7 and 8 which are hingedly connected to the rake supporting element 6 and to the supporting beam 3 by hinge means of vertical hinge pins 9, 10, 11 and 12. Viewed from above the center lines of the pins 9, 10, 11 and 12 constitute the angular points of a parallelogram.

Cranks 13A, 28A, 31A, 13B, 29B and 31B are supported in the oblique supporting beam 3, each of said cranks carrying a rake wheel 14A, 29A, 32A, 14B, 29B' and 31B' at the free end. Owing to the weight of the rake wheels 14A, 29A, 32A, 14B, 29B' and 31B' and to the fact that the cranks 13A, 28A, 31A, 13B, 29B and 31B can freely rotate in the bearings 15A, 30A, 33A, 15B, 30B, 33B incorporated in the supporting beam 3, the rake wheels exert a pressure over the ground. In order not to permit said pressure to be too great, drawsprings 16 are mounted in a manner well known in the art whereby such springs tend to make the cranks 13 move opposite to a rotation caused by the weight of the rake wheels 14.

The rake wheels 14 are provided at their circumferences with tines 17 which serve as catching means for the material. The tines located at the lower side of the wheel are slightly in contact with the ground. If the frame advances in the direction of the arrow V drawn in Fig. 1, the device will work as follows. Each rake wheel will begin to rotate about the free end of its crank in such a manner that the lower tines move with regard to the ground in a direction perpendicular to the wheelplane. During said movement the material (e.g. grass or hay) will be seized and taken along by the tines 17. As the lower sides of the wheels rotate with respect to the direction of travel of the mobile frame not only rearwardly but also laterally, a lateral displacement of the seized material takes place. During said displacement the material lying on the ground is put within the reach of the second rake wheel by means of the foremost rake wheel and afterwards it is led from wheel to wheel conjointly with other material and at last it is put aside by the last wheel, so that the device works as a side delivery rake.

In view of the swath turning function of the device, the supporting beam 3 is two pieces in the embodiment according to Fig. 1. The foremost part 3A and the hindmost part 3B of said beam 3 are releasably coupled to each other by means of a pin 18 and rigid connection means 18A. Owing to that, the hindmost part 3B, supporting element for half of rake wheels 14A, 29A and 32A, can be put aside of said part 3A and parallel to it and said part 3B can be coupled to a draw arm 20 in 19, which position is shown in Fig. 2. The rake supporting element 6, the cross beams 4 and 5 and the foremost half 3A of the frame beam 3 form together a rigid structure relative to which the draw arm 20 is rotatable about the pin 10.

The lateral displacement of the hindmost part 3B of the supporting beam takes place as follows: The pins 11 and 12 of the hindmost part 3B (which is carried by the rear running wheel 2 and is connected to the rake supporting element 6 by means of both pivot beams 7 and 8 extending over the rake wheels 14), can be led in circles about the pins 9 and 10, whilst the part 3B maintains always the same direction as the part 3A. Cranks 21 and 22 are rigidly mounted on the pivot beams 7 and 8, the extremities of said cranks being hingedly fixed to the extremities of a connecting bar 23. The rearmost part of the supporting beam part 3B thus forms conjointly with the pivot beams 7 and 8 and with the connecting bar 23 a hinged parallelogram-shaped construction, of which the pivot beams 7 and 8, the bar 23, and the outer portion of the supporting beam 3B form the sides. The parallel sides of said hinged parallelogram-shaped construction are coupled in the angular pins 9 and 10 to two parallel sides of the parallelogram which is constituted by the part 3B of the supporting beam 3, both pivot beams 7 and 8 and the rake supporting element 6. If the pin 11 is coplanar with the pins 9 and 10, the position of the pin 12 in the same plane is ensured by said coupling in spite of the inevitable play. Due to this, the part 3B of the supporting beam 3 therefore remains parallel to the part 3A when the pins 11 and 12 move through the plane comprising the pins 9 and 10.

After having released the part 3B from the part 3A of the supporting beam and after having detached the adjusting arm 24 (Fig. 1) from the accessory adjusting plate 25 rigidly connected to the rake supporting element 6, the part 3B can be swung around to the position shown in Fig. 2, the adjusting arm 24 being a rigid link fixed to the adjusting plate 26 which is rigidly connected to the cross beam 4. The turned part 3B of the supporting beam, moreover, is immovably attached to the draw arm 20 in 19 by means of the connecting member 27.

In the position shown in Fig. 2 it will be possible to turn two swaths at the same time by means of the device.

Figure 3:
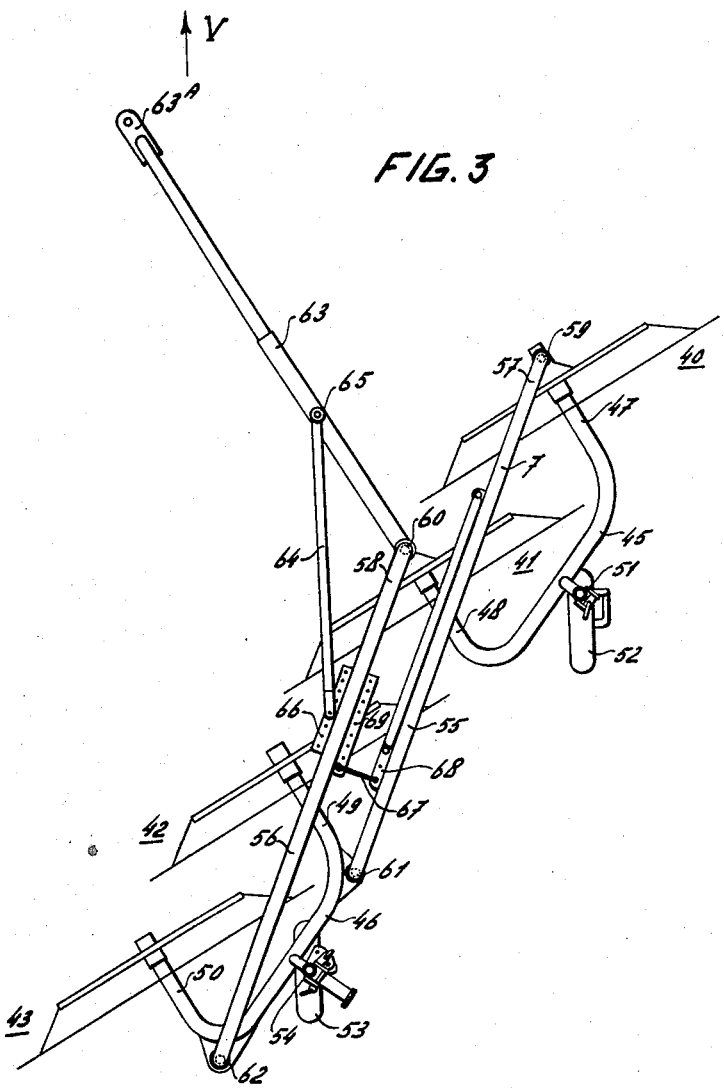
Fig. 3 shows a plan view of a second embodiment according to the invention.

In the embodiment of a side delivery rake according to the invention shown in Fig. 3 four rake wheels 40, 41, 42 and 43 are mounted in pairs on rake supporting elements consisting of two U-shaped frame tubes 45 and 46, said rake wheels being rotatable about the legs 47, 48, 49 and 50, respectively, of these U-shaped frame tubes. The central part of the frame tubes 45, 46, respectively, is supported by an adjusting running wheel 52 which is rotatable about a vertical swing axle 51, or, respectively, by a running wheel 53 the plane of which can be adjusted about a vertical axle 54. The frame tubes 45 and 46 are movably attached to each other by means of two rigid links comprising pivot beams 55 and 56. The fore-parts 57 and 58 of said arms are connected in front of the rake wheels 40 and 41 to the legs 47 and 48 of the frame tube 45 by means of vertical hinge pins 59 and 60, whereas the other ends of the pivot beams 55 and 56 are connected behind the rake wheels 42 and 43 to the legs 49 and 50 of the frame tube 46 by means of vertical hinge pins 61 and 62. Each four coplanar points of the four center lines of the hinge pins 59, 60, 61 and 62 constitute the angular points of a parallelogram. A draw arm 63 together with its forepart 63A is rotatable about the hinge pin 60. The device can be pulled forward in the direction V by the fore-part 63A. The position of this draw arm with regard to the pivot beam 56 is adjusted by means of a supporting bar 64, the fore-part of which can be hingedly fixed in 65 to the draw arm 63 and the other end to the adjusting plate 66 which is rigidly attached to the pivot beam 56. The mutual position between the arms 55 and 56 and the frame tubes 45 and 46 can be adjusted by a rigid connection means comprising a bar 67 which interconnects releasably two adjusting plates 68 and 69 being connected to the pivot beams 55, 56, respectively.

The device according to Fig. 3 working as a side delivery rake when advancing in the direction V, can be transformed into a swath turner by releasing the supporting link 64 and the bar 67 and by putting the arms 55 and 56 in the position shown in Fig. 4 by turning about the pins 59 and 60. Said position is adjusted by rigid connection means comprising a bar 70 which is connected with one end to the adjusting plate 68 and with the other end to the adjusting plate 69. At the same time the draw arm 63 is turned clockwise about the pin 60 and adjusted in the new position by means of the supporting bar 64 now being attached to the supporting plate 69. In the new position according to Fig. 4 the device forms a swath turner in which the rake wheels 40 and 41 turn conjointly a swath and the rake wheels 42 and 43 work conjointly another swath in the same manner.

What we claim is:

1. A convertible side delivery rake comprising a pair of rigid supporting frames, each frame having mounted thereon raking wheel means, a pair of parallel rigid frame members each having its terminal portions pivotally connected to corresponding supporting frames, a rigid frame member adjustably interconnecting two of said frame members, a draw bar pivotally connected to one of said frame members, a fixed portion ground supporting means attached to one of said supporting frames.

2. A convertible side delivery rake comprising a pair of rigid supporting frames, each frame having mounted thereon raking wheel means, a pair of parallel rigid frame members each having its terminal portions pivotally connected to corresponding supporting frames, a rigid frame member adjustably interconnecting two of said frame members, a draw bar pivotally connected to one of said frame members, and a dirigible ground supporting means attached to one of said supporting frames.

3. A convertible side delivery rake comprising a pair of rigid supporting frames, each frame having mounted thereon raking wheel means, a pair of parallel rigid frame members each having its terminal portions pivotally connected to corresponding supporting frames, a rigid frame member adjustably interconnecting two of said frame members, a draw bar pivotally connected to one of said frame members, and a brace member adjustably connected to said draw bar and one of said frame members, a fixed portion ground supporting means attached to one of said supporting frames, and locking means connected to said ground supporting means to secure the same in fixed position.

4. The structure of claim 1 wherein said fixed portion ground supporting means comprises a running wheel.

5. The structure of claim 2 wherein said dirigible ground supporting means comprises a running wheel.

6. The structure of claim 3 wherein said fixed portion ground supporting means comprises a running wheel.

7. The structure of claim 1 wherein said raking wheel means comprises a pair of raking wheels mounted on each supporting frame.

8. The structure of claim 2 wherein said raking wheel means comprises a pair of raking wheels mounted on each supporting frame.

9. The structure of claim 3 wherein said raking wheel means comprises a pair of raking wheels mounted on each supporting frame.

10. The structure of claim 7 wherein each pair of rake wheels is mounted in parallel relationship with the other pair of rake wheels.

11. The structure of claim 8 wherein each pair of rake wheels is mounted in parallel relationship with the other pair of rake wheels.

12. The structure of claim 9 wherein each pair of rake wheels is mounted in parallel relationship with the other pair of rake wheels.

13. The structure of claim 1 wherein said raking wheel means comprises at least one raking wheel rotatably mounted on each supporting frame, the raking wheel on one supporting frame being parallel with the raking wheel on the other supporting frame.

14. The structure of claim 2 wherein said raking wheel means comprises at least one raking wheel rotatably mounted on each supporting frame, the raking wheel on one supporting frame being parallel with the raking wheel on the other supporting frame.

15. The structure of claim 3 wherein said raking wheel means comprises at least one raking wheel rotatably mounted on each supporting frame, the raking wheel on one supporting frame being parallel with the raking wheel on the other supporting frame.

16. The structure of claim 1 wherein said ground supporting means is mounted on one of said supporting frames midway the length thereof.

17. The structure of claim 2 wherein said ground supporting means is mounted on one of said supporting frames midway the length thereof.

18. The structure of claim 3 wherein said ground supporting means is mounted on one of said supporting frames midway the length thereof.

19. The structure of claim 1 wherein said raking wheel means comprises at least one raking wheel mounted on each supporting frame, said raking wheels being in parallel relationship with each other, said supporting frames and parallel rigid frame members forming a substantial rectangle in one position of adjustment of said convertible side delivery rake, said ground supporting means comprising a running wheel and a second running wheel operatively connected to said side delivery rake.

20. The structure of claim 2 wherein said raking wheel means comprises at least one raking wheel mounted on each supporting frame, said raking wheels being in parallel relationship with each other, said supporting frames and parallel rigid frame members forming a substantial rectangle in one position of adjustment of said convertible side delivery rake, said ground supporting means comprising a running wheel and a second running wheel operatively connected to said side delivery rake.

21. The structure of claim 3 wherein said raking wheel means comprises at least one rake wheel mounted on each supporting frame, said rake wheels being in parallel relationship with each other, said supporting frames and parallel rigid frame members forming a substantial rectangle in one position of adjustment of said convertible side delivery rake, said ground supporting means comprising a running wheel and a second running wheel operatively connected to said side delivery rake.

22. The structure of claim 1 wherein said raking wheel means comprises a pair of wheels mounted on each supporting frame adjacent said terminal portions of said frame members.

23. The structure of claim 2 wherein said raking wheel means comprises a pair of wheels mounted on each supporting frame adjacent said terminal portions of said frame members.

24. The structure of claim 3 wherein said raking wheel means comprises a pair of wheels mounted on each supporting frame adjacent said terminal portions of said frame members.

25. The structure of claim 1 wherein said rigid supporting frames comprise U-shaped frame tubes.

26. The structure of claim 2 wherein said rigid supporting frames comprise U-shaped frame tubes.

27. The structure of claim 3 wherein said rigid supporting frames comprise U-shaped frame tubes.

28. The structure of claim 25 wherein said ground supporting means comprises a running wheel, and a second running wheel operatively connected to said other supporting frame.

29. The structure of claim 26 wherein said ground supporting means comprises a running wheel, and a second running wheel operatively connected to said other supporting frame.

30. The structure of claim 27 wherein said ground supporting means comprises a running wheel, and a second running wheel operatively connected to said other supporting frame.

References Cited in the file of this patent

FOREIGN PATENTS

| | | |
|---|---|---|
| 680,537 | Great Britain | Oct. 8, 1952 |
| 1,076,339 | France | Apr. 21, 1954 |
| 1,080,088 | France | May 26, 1954 |
| 1,081,746 | France | June 9, 1954 |
| 1,084,872 | France | July 13, 1954 |